(12) United States Patent
Kang et al.

(10) Patent No.: US 12,032,090 B2
(45) Date of Patent: Jul. 9, 2024

(54) AIR-COUPLED TYPE GROUND PENETRATING RADAR ANTENNA

(71) Applicant: KOREA INSTITUTE OF GEOSCIENCE AND MINERAL RESOURCES, Daejeon (KR)

(72) Inventors: Woong Kang, Daejeon (KR); Chang Ryol Kim, Daejeon (KR); Seong Jun Cho, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 763 days.

(21) Appl. No.: 17/256,140

(22) PCT Filed: Jul. 8, 2019

(86) PCT No.: PCT/KR2019/008343
§ 371 (c)(1),
(2) Date: Dec. 24, 2020

(87) PCT Pub. No.: WO2020/027453
PCT Pub. Date: Feb. 6, 2020

(65) Prior Publication Data
US 2021/0124010 A1  Apr. 29, 2021

(30) Foreign Application Priority Data
Jul. 30, 2018  (KR) .................. 10-2018-0088834

(51) Int. Cl.
*G01S 7/03* (2006.01)
*G01S 13/00* (2006.01)
*G01S 13/88* (2006.01)

(52) U.S. Cl.
CPC ............ *G01S 7/032* (2013.01); *G01S 13/003* (2013.01); *G01S 13/885* (2013.01)

(58) Field of Classification Search
None
See application file for complete search history.

(56) References Cited

U.S. PATENT DOCUMENTS 6,437,750 B1 * 8/2002 Grimes .................. H01Q 21/26
  343/726
6,972,690 B1 * 12/2005 Schaefer ................ H04B 13/02
  340/852

(Continued)

FOREIGN PATENT DOCUMENTS

EP  2 764 573 A0  8/2014
GB  2 292 859 A   3/1996

(Continued)

OTHER PUBLICATIONS

Extended European Search Report for Application No. 19845315.1, dated Mar. 25, 2022, 10 pages.
Yarovoy et al., "Antenna system for UWB GPR for landmine detection," Proceedings of SPIE, vol. 4394, Oct. 18, 2001, pp. 692-699, XP055541751.

*Primary Examiner* — Bernarr E Gregory
(74) *Attorney, Agent, or Firm* — Lewis Roca Rothgerber Christie LLP

(57) ABSTRACT

The present invention relates to an air-coupled type bistatic ground penetrating radar (GPR) antenna and, more specifically, to an air-coupled type ground penetrating radar (GPR) antenna which reduces reception of a direct wave, which is a factor limiting imaging performance of a system when being received at a receiving side of the GPR antenna, by placing a loop antenna at a receiver point so as to be vertical to an antenna plane with respect to a polarization direction of a transmitting antenna and configuring a feeding direction to be orthogonal to a feeding direction of a transmitter and the ground surface. The air-coupled type GPR antenna, which is spaced apart from the ground, comprises: the transmitting antenna directed towards the ground and penetrating a radio wave into the ground; and a receiving (Continued)

antenna receiving a radio wave, which is radiated from the transmitting antenna and then reflected from the ground, and fed in a direction perpendicular to the ground surface and the feeding direction of the transmitting antenna. The transmitting antenna uses an antenna, such as a horn antenna, having directivity and the receiving antenna uses a loop antenna in which a physical plane of the antenna is positioned to be perpendicular to the ground surface with respect to the polarization direction, thereby resulting in the effect of improving radar detection performance of an air-coupled type GPR system.

5 Claims, 8 Drawing Sheets

(56) References Cited

U.S. PATENT DOCUMENTS

| | | | |
|---|---|---|---|
| 2004/0183739 A1 | 9/2004 | Bisiules et al. | |
| 2010/0315280 A1* | 12/2010 | Bakhtar | G01S 13/885 342/22 |
| 2014/0232585 A1 | 8/2014 | Richardson et al. | |
| 2017/0148567 A1* | 5/2017 | Rosenfeld | G01S 13/885 |

FOREIGN PATENT DOCUMENTS

| | | |
|---|---|---|
| KR | 97-701935 A | 4/1997 |
| KR | 10-2016-0089814 A | 7/2016 |
| KR | 10-2016-0091846 A | 8/2016 |
| KR | 10-1945824 B1 | 2/2019 |
| WO | WO 2016/128952 A1 | 8/2016 |

* cited by examiner

AIR-COUPLED TYPE GROUND PENETRATING RADAR ANTENNA

CROSS-REFERENCE TO RELATED APPLICATION(S)

This application is a National Phase Patent Application of International Patent Application Number PCT/KR2019/008343, filed on Jul. 8, 2019, which claims priority of Korean Patent Application No. 10-2018-0088834, filed Jul. 30, 2018. The entire contents of both of which are incorporated herein by reference.

BACKGROUND

1. Technical Field

The present disclosure relates to an air-coupled type ground penetrating radar antenna, and more particularly, to an air-coupled type ground penetrating radar antenna which may reduce a magnitude of a direct wave signal limiting imaging performance of a system when being received at a receiving side of the ground penetrating radar (hereinafter; referred to as "GPR") by placing a directional antenna used for the air-coupled GPR at a transmitter point, placing a loop antenna at a receiver point to be vertical to a transmitting and receiving antenna plane and providing a feeding direction to be orthogonal to a feeding direction of a transmitter.

2. Description of Related Art

In general, GPR antennas include ground-coupled type GPR antennas and air-coupled type GPR antennas according to forms.

The ground-coupled type GPR antenna is used to detect abnormal substances or discontinuous surfaces with a relatively deep depth (1 to 10 m), but as the ground-coupled type GPR antenna has to be attached to the ground, a planar antenna with relatively low directivity is used. Representative examples of the ground-coupled type GPR antenna include a dipole antenna and a bowtie antenna.

The air-coupled type GPR antenna is used for safety diagnosis of pavements and bridges with a relatively shallow depth (0.3 to 1 m) and is operated away from the ground, so an antenna with high directivity is used. Representative examples of the air-coupled type GPR antenna include a horn antenna and a Vivaldi antenna.

FIG. 1 is a schematic view showing a flow of radio waves of a general bistatic antenna and FIG. 2 is a graph showing signals received at a receiving antenna of a bistatic antenna.

Referring to FIGS. 1 and 2, a dynamic range is a ratio between maximum signal amplitude (generally near a peak value of direct wave) and identifiable minimum amplitude (near a noise level) and the dynamic range and the ratio are meaningful major indices of system performance.

FIG. 3 shows directions and propagation paths of electric field and magnetic field in a general ground penetrating radar (GPR) antenna.

Referring to FIG. 3, a transmitting antenna 10 and a receiving antenna 20 arranged in parallel to an x-axis are shown. That is, the transmitting antenna 10 and the receiving antenna 20 are in a horizontal state with respect to an xy-plane indicated by alternated long and short dash lines.

A propagation path from the transmitting antenna 10 to the receiving antenna 20 is indicated by a thick solid line. The propagation path may include a path of a direct wave 12 and a path of a reflected wave 14 for a discontinuous surface of radar. The transmitting antenna 10 and the receiving antenna 20 are arranged in parallel to an x-y plane, that is, an antenna plane 22.

A direction of an electric field (Ex field) 11 of electromagnetic wave radiated from the transmitting antenna 10 is an x-axis direction which is the same as a feeding direction of the transmitting antenna 10. As shown in FIG. 3, the electric field 11 has a concentric shape and has a vertical direction in with respect to a plane shown in the drawing. In addition, the transmitting antenna 10 has a concentric shape and has a vertical feeding direction in the plane shown in the drawing. As the discontinuous surface of the radar is made of a perfect conductor, a direction of an electric field (Ex field) 15 of radio wave 14 radiated from the transmitting antenna 10, reflected from the discontinuous surface of the radar, and returned back is reversed with respect to a direction thereof before reflected and is a vertical direction with respect to the plane shown in the drawing. As described above, the electric field 11 of the direct wave 12 and the electric field 15 of the reflected wave 14 are opposite to each other in FIG. 3, but the component (Ex) remains unchanged. In FIG. 3, the receiving antenna 20 has a concentric shape and a feeding direction is perpendicular to a surface of the concentric surface in the plane shown in the drawing.

On the propagation path from the transmitting antenna 10 to the receiving antenna 20, all of the direct waves 12 indicated by thick solid lines are tangential components with respect to the antenna plane (e.g., the x-y plane indicated by an alternated long and short dash line in FIG. 3) and a portion 14a indicated by solid dotted line of the reflected wave 14 indicated by thick solid line is a tangential component 14a on the antenna plane of the reflected wave 14 and the other one 14b indicated by solid dotted line is a normal component 14b on the antenna plane of the reflected wave 14.

As a propagation direction of the tangential component 14a of the reflected wave 14 is a y-axis direction parallel to the antenna plane and the direction of the electric field 15 of the reflected wave is an x-axis direction, a magnetic field direction 16a is a z-axis direction. As a propagation direction of the normal component 14b of the reflected wave 14 is a z-axis direction that is perpendicular to the antenna plane and the electric field direction 15 of the normal component of the reflected wave is the x-axis direction without change, the magnetic field direction 16b of the normal component of the reflected wave is a y-axis direction. As described above, when the transmitting and receiving antennas have the same shape and have the same polarization characteristics, the direct wave and the reflected wave have only one polarization component (Ex). In this case, the receiving antenna completely receives both a direct wave signal and a reflected wave signal. The system dynamic range of the GPR system has a fixed range. The fixed range has a unique value for the GPR system, and in this situation, in order to detect a radar signal of a less level from the GPR image obtained through detection, the signal of the direct wave 12 directly propagating from the transmitting antenna 10 to the receiving antenna 20 may be reduced. That is, the direct wave, which is a signal other than the reflected wave 14 used to detect a underground structure, may act as a factor limiting the imaging performance of the system, and thus, the direct wave is preferably minimized at a data acquisition step.

SUMMARY OF THE INVENTION

Accordingly, the present disclosure is to resolve the above-described problems of the above-mentioned related art and provides an air-coupled type ground penetrating radar antenna which reduces a magnitude of a direct wave signal limiting imaging performance of a system to improve detection performance on underground discontinuous surface of the air-coupled type ground penetrating radar when being received at a receiving side of the ground penetrating radar (hereinafter; referred to as "GPR") antenna by placing a directional antenna used for the air-coupled GPR at a transmitter point, placing a loop antenna at a receiver point to be vertical to a transmitting and receiving antenna plane with respect to a planarization direction of the transmitting antenna and providing a feeding direction to be orthogonal to a feeding direction of a transmitting antenna.

An air-coupled type ground penetrating radar (GPR) antenna of the present disclosure for achieving the above object, which is an air-coupled type bistatic GPR antenna that is spaced apart from the ground may include:

a transmitting antenna configured to direct toward the ground and penetrate the radio wave into the underground;

a receiving antenna configured to receive the radio wave radiated from the transmitting antenna and then reflected from the underground and having a feeding direction perpendicular to each of a feeding direction of the transmitting antenna and the ground surface; and The transmitting antenna may use an antenna having high directivity. 'Having a high directivity' means that its directivity is higher than that of an omnidirectional antenna such as a dipole antenna.

The receiving antenna includes a loop antenna and a feeding direction of the loop antenna is perpendicular to the feeding direction of the transmitting antenna, and the pair of transmitting and receiving antennas may be arranged in parallel to the ground surface.

The receiving antenna includes the loop antenna and a physical plane perpendicular to the plane of ground surface.

Each of the transmitting antenna and the receiving antenna may be designed by adjusting a length or a width of the antenna to meet frequency and a bandwidth for transmitting and receiving electromagnetic wave pulses. An impedance element having a predetermined impedance value is loaded at points inside the antenna as necessary to minimize ringing occurring inside the transmitting antenna and the receiving antenna.

The transmitting antenna and the receiving antenna are blocked by metal box or non-metal box around the antennas and a radio wave absorbing material is filled in the blocking box to prevent spurious radiation of the radio waves into the air.

Therefore, an air-coupled type ground penetrating radar antenna of the present disclosure may reduce a level of reception of a direct wave to improve radar detection performance of the air-coupled ground penetrating radar system, which may limit detection data quality when being received at a receiving side of the ground penetrating radar (hereinafter; referred to as "GPR") by placing loop antenna at a receiver point to be vertical to a plane of a transmitting antenna with respect to a planarization direction of the transmitting antenna, and providing a feeding direction of the receiving antenna orthogonal to each of a feeding direction of the transmitting antenna and the ground.

DETAILED DESCRIPTION

Hereinafter, the present disclosure will be described in more detail with reference to the accompanying drawings showing embodiments of the present disclosure.

Figure 4:
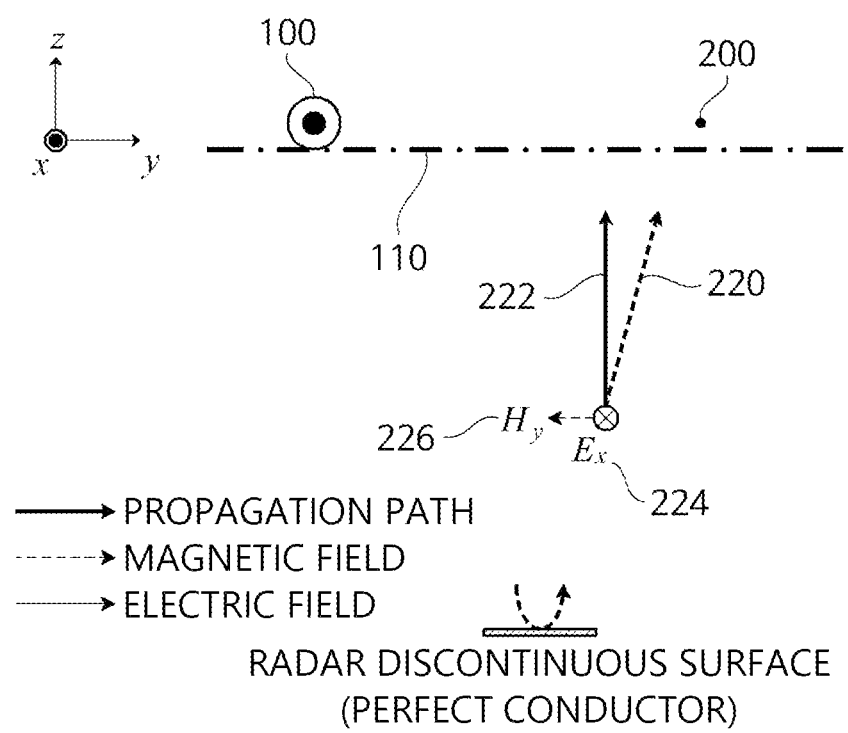
FIG. 4 shows a propagation path from a transmitting antenna to a receiving antenna and directions of an electric field and a magnetic field according to an embodiment of the present disclosure.
Figure 5:
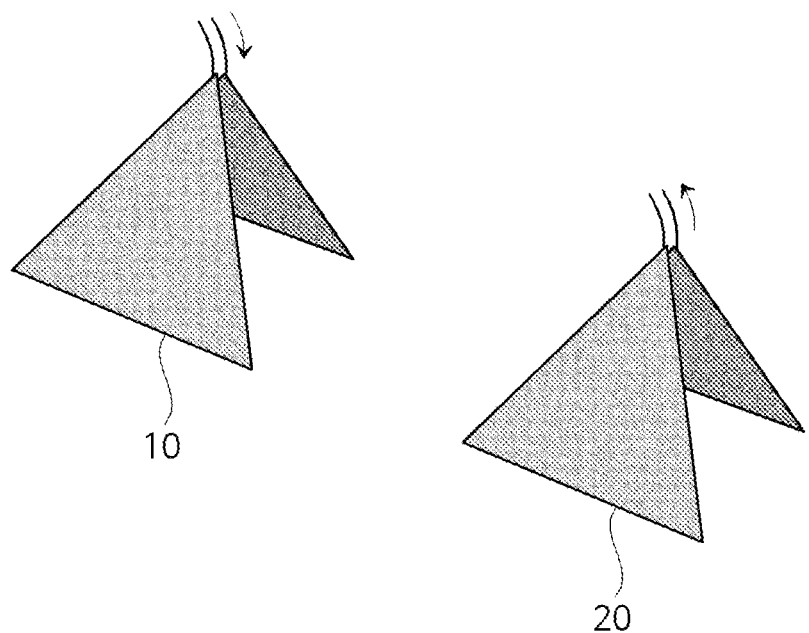
FIG. 5 shows an arrangement of a transmitting antenna and a receiving antenna of a general air-coupled type GPR.
Figure 6:
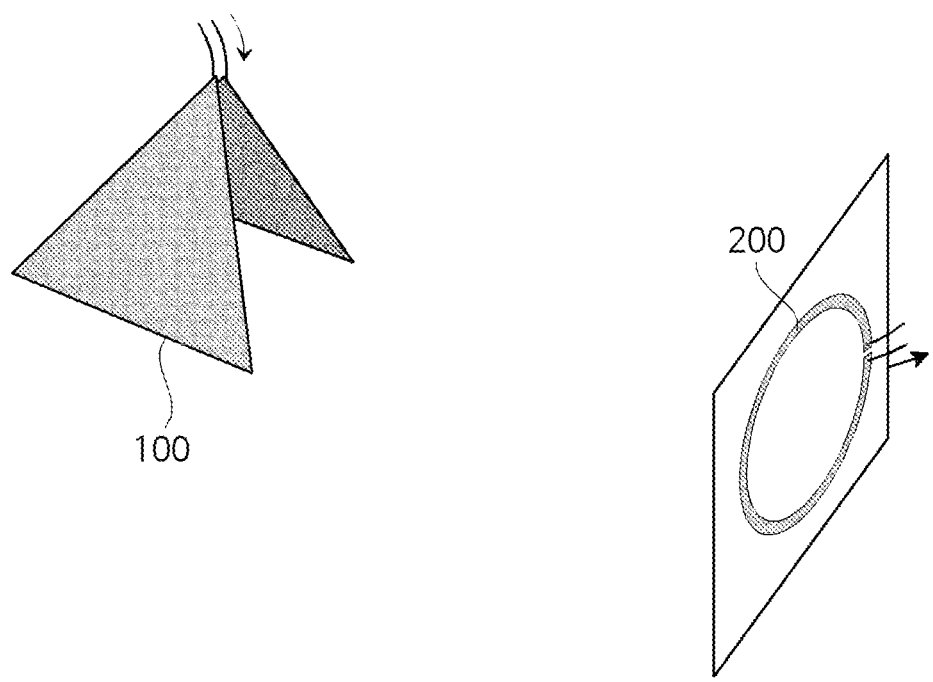
FIG. 6 shows an arrangement of a transmitting antenna and a receiving antenna of an air-coupled type GPR according to an embodiment of the present disclosure.
Figure 7:
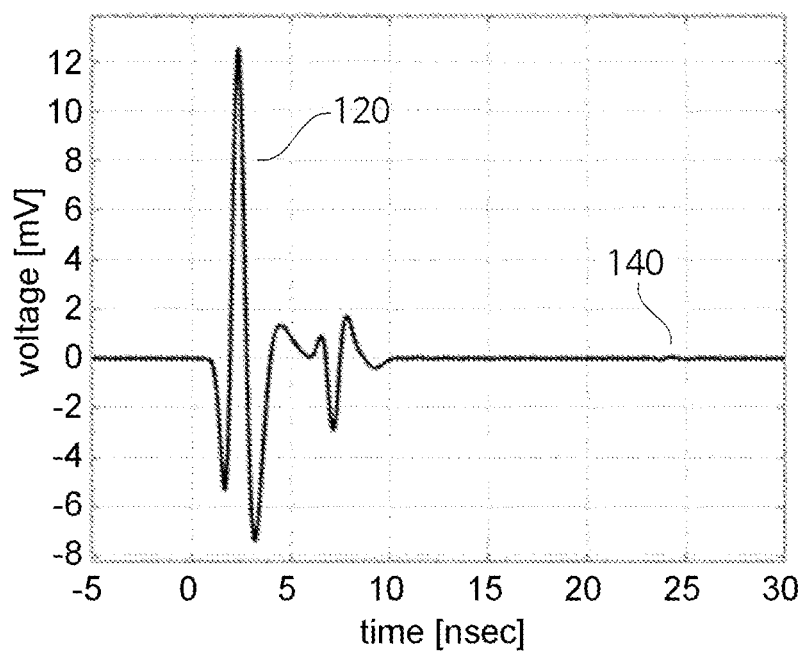
FIG. 7 is a graph showing a signal received at a receiving antenna of a general air-coupled type GPR.
Figure 8:
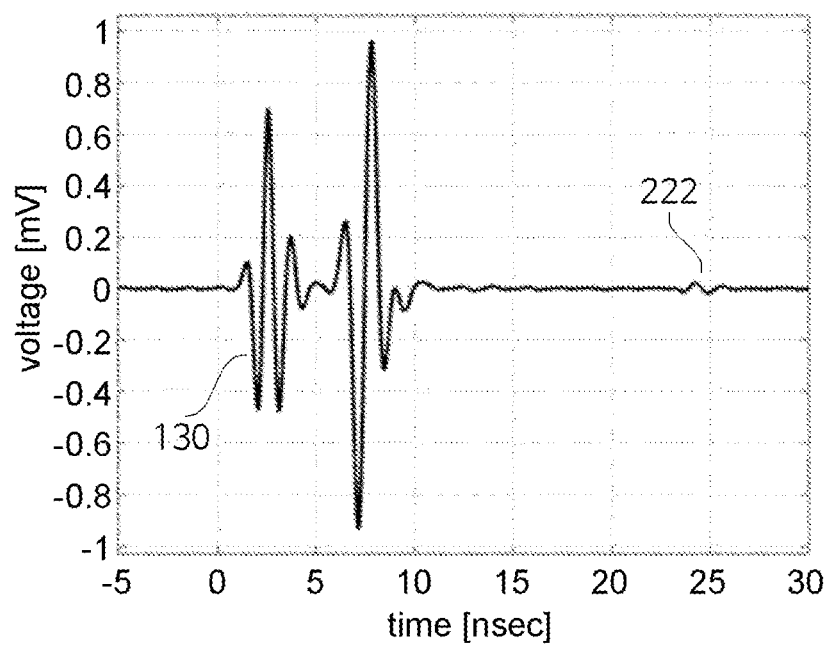
FIG. 8 is a graph showing a signal received at a receiving antenna of an air-coupled type GPR according to an embodiment of the present disclosure.

FIG. 4 shows a propagation path from a transmitting antenna to a receiving antenna and directions of an electric field and a magnetic field according to an embodiment of the present disclosure. FIG. 5 shows an arrangement of a transmitting antenna and a receiving antenna of a general air-coupled type GPR. FIG. 6 shows an arrangement of a transmitting antenna and a receiving antenna of an air-coupled type GPR according to an embodiment of the present disclosure. FIG. 7 is a graph showing a signal received at a receiving antenna of the general air-coupled type GPR in FIG. 5. FIG. 8 is a graph showing a signal received at the receiving antenna of the air-coupled type GPR in FIG. 6 according to an embodiment of the present disclosure.

Referring to FIGS. 4 to 6, the air-coupled type ground penetrating radar antenna of the present disclosure includes a transmitting antenna 100 and a receiving antenna 200.

In an embodiment of the present disclosure, a virtual experiment was performed using a horn antenna with high directivity as the transmitting antenna 100 and a loop antenna as the receiving antenna 200 and was compared with a virtual experiment conducted using a horn antenna, which is a general air-coupled type ground penetrating radar antenna, as the transmitting antenna 10 and the receiving antenna 20.

The transmitting antenna 100 radiates the transmitting signal toward the ground and penetrates radio wave into the ground.

The receiving antenna 200 receives radio waves radiated from the transmitting antenna 100, penetrating the ground, and reflected from the underground. A feeding direction of the receiving antenna 200 crosses vertically each of a feeding direction of the transmitting antenna 100 and the ground. Preferably, the transmitting antenna 100 uses a horn antenna having directivity.

In the configuration of the transmitting antenna and the receiving antenna in FIG. 4 according to an embodiment of the present disclosure, the feeding direction of the transmitting antenna 100 and a direction of an electric field 224 (E field) of electromagnetic wave radiated from the transmitting antenna 100 are each an x-axis direction. In addition, the z-axis component 222 of the reflected wave 220 corresponds to a normal component on an antenna plane 110. As described above, the direction of the normal component 222 is a z-axis direction perpendicular to the antenna plane 110. As the direction of the electric field (E field) is the x-axis direction, the magnetic field direction perpendicular to each of the electric field and propagation direction is the y-axis direction.

Figure 1:
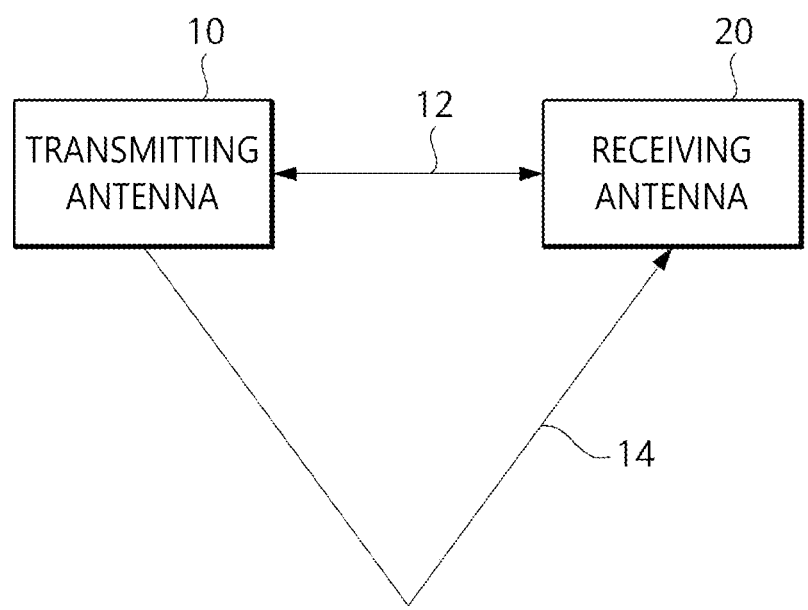
FIG. 1 is a schematic view showing flow of radio wave of a transmitting antenna and a receiving antenna of general bistatic radar.
Figure 2:
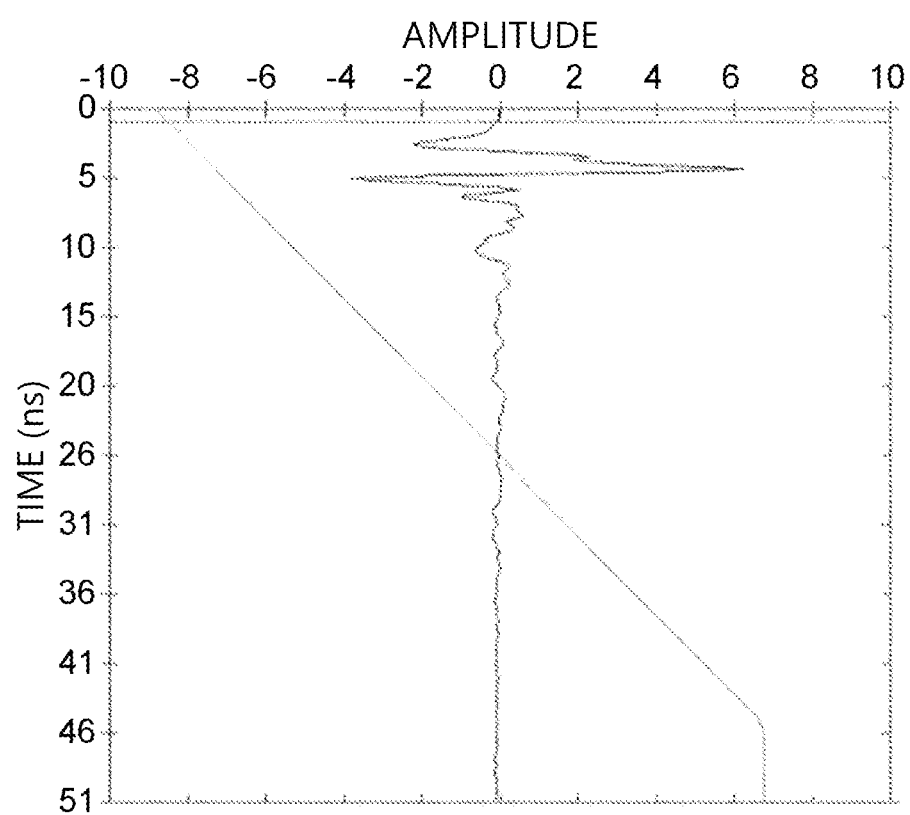
FIG. 2 is a graph showing signals received at a receiving antenna of bistatic ground penetrating radar (GPR).
Figure 3:
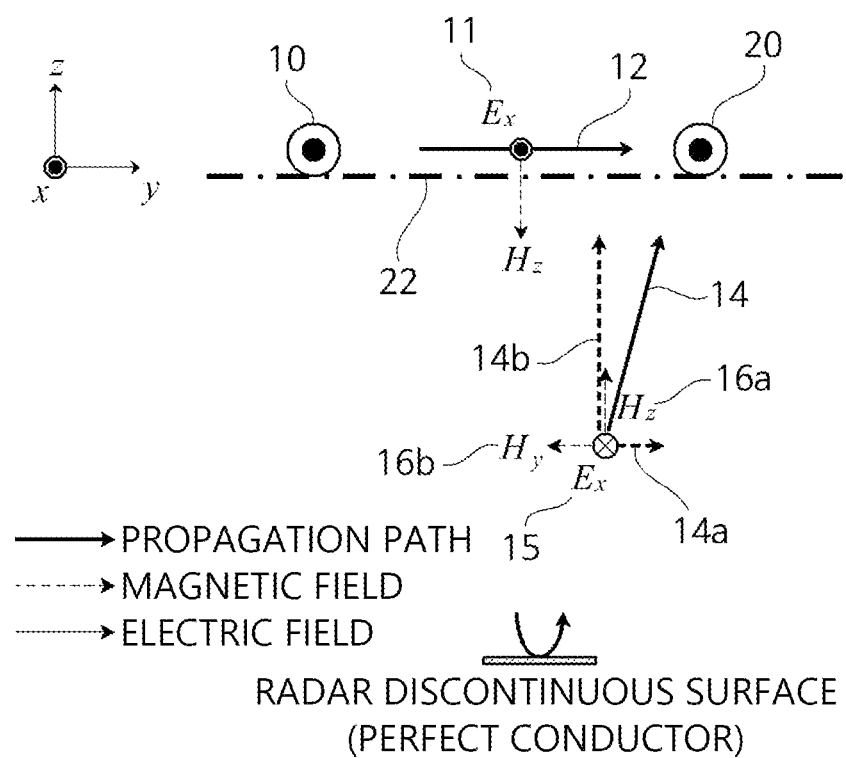
FIG. 3 shows a propagation path from a transmitting antenna to a receiving antenna of a general bistatic GPR and a direction of electromagnetic field.

In FIG. 3, the air-coupled type GPR including the receiving antenna to receive the y-axis component (Hy) of the magnetic field is configured to completely receive the direct wave 12 and the reflected wave 14. The GPR according to an embodiment of the present disclosure in FIG. 4 may be configured as shown in FIG. 6 to obtain the reflected wave including only the normal component 222 on the plane 110. As shown in FIG. 6, a loop antenna is placed at a receiver point such that the loop antenna and the antenna plane 110 are orthogonal to each other with respect to a planarization direction of the transmitting antenna 100, and the receiving antenna 200 may be arranged to have a feeding direction orthogonal to each of the feeding direction of the transmitting antenna 100 and the antenna plane 110. Through this structure, the magnetic field component (Hy) in the y-axis direction may only be obtained at the receiving side by excluding the direct wave.

FIGS. 7 and 8 are graphs showing the results of virtual experiments of signals received at the receiving antennas of the air-coupled type GPRs in FIGS. 5 and 6, respectively. In the virtual experiments using the signals in FIGS. 5 and 6, a distance between the transmitting antenna and the receiving antenna is 60 cm, a height of each of the transmitting antenna and the receiving antenna is 1 m from the ground, and a circular perfect conductor target having a radius of 5 cm is located at a depth of 80 cm from the ground. In addition, an underground medium has electrical properties, for example, a dielectric constant of 10 F/m and an electrical resistivity of 500 Ωm, and a monocycle pulse signal with a peak voltage of 2 V and a center frequency of 500 MHz is applied to the transmitting antenna.

In FIG. 7, it may be seen that a general air-coupled type GPR antenna completely receives a signal of a direct wave 120 at about 2 nsec and a signal of a reflected wave 140 at about 24 nsec. It is found that a ratio between peak values of voltage of the two signals is 0.547%, which is calculated by dividing 0.109 mV by 20 mV. In FIG. 8, an air-coupled type GPR antenna according to an embodiment of the present disclosure receives a portion of the reflected wave, that is, a normal component on the antenna plane and does not receive other waves of the radio wave. In this case, it is found that a ratio between peak values of the direct wave 130 and a normal component 222 of a ground reflected wave and a reflected wave is 2.102%, which is calculated by dividing 0.04 mV by 1.9 mV and is increased four times. Ideally, in FIG. 8, the waves except for the direction wave 139 signal are received. In the virtual experiment, a less magnitude of the reflected wave may be received due to polarization loss of the antenna. In this case, the magnitude of the reflected wave received at the receiving antenna is greater than the antenna in related art.

The directional antenna such as the horn antenna used as the transmitting antenna 100 and the loop antenna used as the receiving antenna 200 may be desired by adjusting parameters such as the length and the width of each of the antennas to meet the frequency and the bandwidth for transmitting and receiving the electromagnetic wave pulses. An impedance loading technique may be used inside the antenna as necessary. The impedance loading technique may be used to load, to the point inside the antenna, the impedance element having the impedance value for any point inside the antenna calculated by a predetermined formula by receiving antenna-design parameters, for example, the lengths or the widths of the antennas and may be used to empirically load the impedance elements having any values to the points inside the antennas. For the general directional antenna (the horn antenna) and the loop antenna not using the impedance loading technique, electromagnetic pulse signals transmitted and received may be greatly distorted due to the ringing occurring in the antennas; however, the waveform distortion of the electromagnetic pulse signals applied to the antenna may be minimized using the impedance loading technique.

In addition, peripheries of the transmitting antenna 100 and the receiving antenna 200 of the present disclosure are blocked by a metal or non-metal box and a radio wave absorbing material is filled in the blocking box, thereby suppressing the spurious radiation of the radio waves into the air.

The contents of the present disclosure have been described with reference to the embodiments illustrated in the drawings, but these are only exemplary, and a person having ordinary knowledge in the art would understand that various modifications and other equivalent embodiments can be made based on the above. Therefore, a true technical protection scope of the present disclosure should be determined by the technical idea of the appended claims.

According to the present disclosure, an air-coupled type ground penetrating radar antenna may reduce a level of reception of a direct wave which may limit data quality when being received at a receiving side of a ground penetrating radar (hereinafter; referred to as "GPR") by placing a loop antenna at a receiver point to be vertical to a transmitting antenna plane with respect to a planarization direction of the transmitting antenna and providing a feeding direction of the receiving antenna orthogonal to a feeding direction of the transmitting antenna and the ground. Therefore, radar detection performance of the air-coupled GPR system may be improved, thereby effectively using the air-coupled GPR system in a radar detection field.

What is claimed is:

1. An air-coupled type ground penetrating radar (GPR) antenna, which is an air-coupled type bistatic GPR antenna spaced apart from the ground, comprising:
   a transmitting antenna configured to direct radio waves toward the ground, wherein the radio waves penetrate the ground and go underground;
   a receiving antenna configured to receive the radio waves radiated from the transmitting antenna and then reflected from the underground and having a feeding direction perpendicular to each of a feeding direction of the transmitting antenna and a ground surface,
   wherein the transmitting antenna is configured to have a directivity higher than that of an omnidirectional antenna.

2. The air-coupled type GPR antenna of claim 1, wherein the receiving antenna comprises a loop antenna and
   wherein the loop antenna has the feeding direction that is perpendicular to the feeding direction of the transmitting antenna, and the transmitting antenna and the receiving antenna are disposed in parallel to the ground surface.

3. The air-coupled type GPR antenna of claim 1,
   wherein the receiving antenna comprises a loop antenna and
   wherein the loop antenna has a physical plane perpendicular to a plane of the ground surface.

4. The air-coupled type GPR antenna of claim 1, wherein each of the transmitting antenna and the receiving antenna is designed by adjusting a length or a width of each of the transmitting antenna and the receiving antenna to meet frequency and a bandwidth for transmitting and receiving electromagnetic wave pulses, is loaded with impedance elements having a predetermined impedance value to points inside of each of the transmitting antenna and the receiving antenna as necessary to minimize ringing occurring inside each of the transmitting antenna and the receiving antenna.

5. The air-coupled type GPR antenna of claim 1, wherein the transmitting antenna and the receiving antenna are
- blocked with a blocking box made of metal or non-metallic material around each of the transmitting antenna and the receiving antenna to suppress radiation of radio waves of a first type into the air, and
- wherein inside of the blocking box includes a radio wave absorbing material.

\* \* \* \* \*